Figure 1:
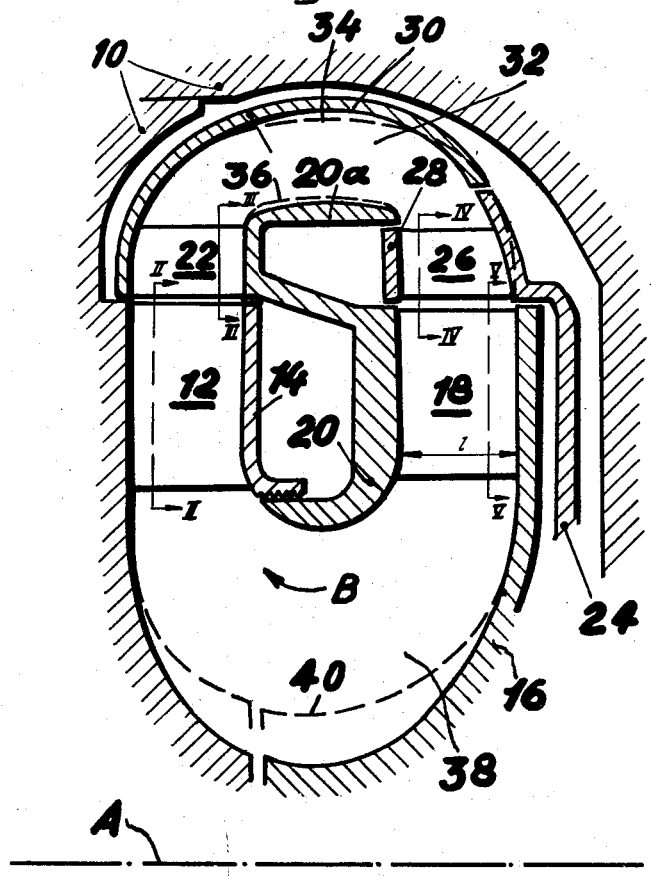

Sept. 28, 1954 K. G. ÅHLÉN 2,690,053
HYDRODYNAMIC TORQUE CONVERTER
Filed March 15, 1950 2 Sheets-Sheet 1

INVENTOR
Karl Gustav Åhlén
BY
ATTORNEY

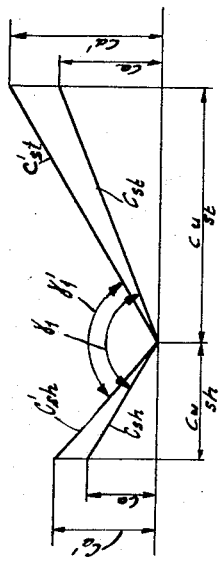
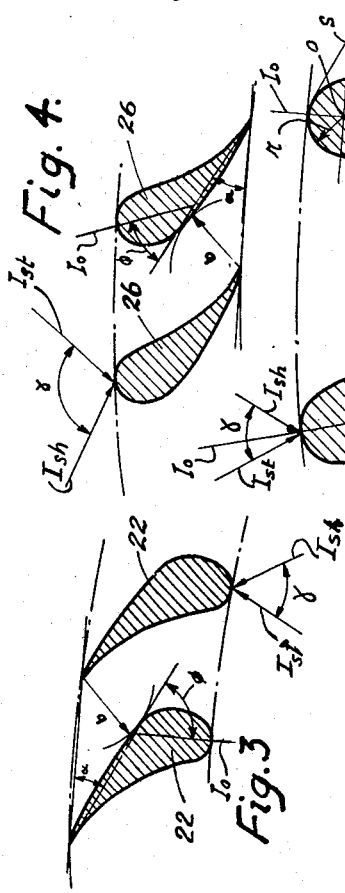
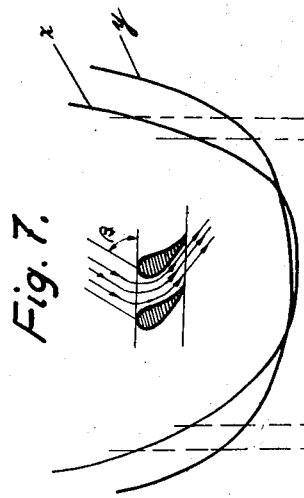
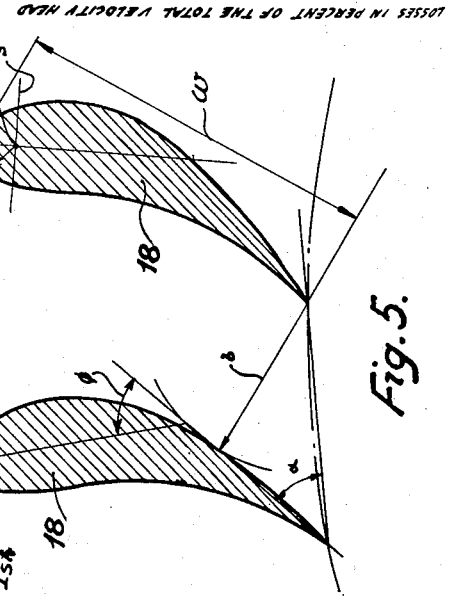

Patented Sept. 28, 1954

2,690,053

UNITED STATES PATENT OFFICE 2,690,053

HYDRODYNAMIC TORQUE CONVERTER

Karl Gustav Åhlén, Stockholm, Sweden, assignor, by mesne assignments, to Jarvis C. Marble, New York, N. Y., Leslie M. Merrill, Westfield, N. J., and Percy H. Batten, Racine, Wis., trustees Application March 15, 1950, Serial No. 149,776

Claims priority, application Sweden March 15, 1949

16 Claims. (Cl. 60—54)

The present invention relates to hydrodynamic torque converters providing a circuit for working fluid in which are located an impeller, one or more rings of turbine blades and one or more rings of reaction or guide blades.

It is characteristic of converters of the kind under consideration that the torque conversion of input or primary torque to secondary or output torque usually provides the maximum amount of torque increase or multiplication at stall conditions, that is, with the primary or pump member operating and the secondary or turbine member standing still. It is a further characteristic that as the speed ($n_2$) of the secondary member increases from stall and approaches the speed ($n_1$) of the primary member, the amount of torque multiplication decreases until a speed ratio $n_2/n_1$ is reached between the primary and secondary members when no torque increase is obtained and the values of the input and output torques are equal. The latter condition is usually referred to as the shift point and with few exceptions the useful operating range of the converter lies between stall and shift point conditions. It would be highly desirable to have the shift point at a speed ratio $n_2/n_1$ equal to unity but the inherent nature of converters renders this impossible. The efficiency characteristics of converters are in general of the nature of turbine characteristics, the efficiency rising from zero at stall to a maximum value at an optimum value of $n_2/n_1$ determined by the design and falling as the speed ratio increases to the shift point.

For variable speed, variable load applications and particularly for traction drives, several different performance characteristics are desirable in the same converter, one or more of which are relatively readily obtained in the same device but all of which are exceedingly difficult to obtain. Among the more important of these are a high value of torque multiplication at stall, high peak efficiency, and a wide operating range between stall and shift point. High stall torque ratio requires relatively high efficiency at low values of $n_2/n_1$ and a high value of $n_2/n_1$ at the shift point requires high efficiency in the upper portion of the operating range past the peak efficiency point, since the value of $n_2/n_1$ at the shift point is equal to the efficiency at that point.

The above characteristics therefore are best attained by a construction providing the flattest efficiency curve obtainable over the operating range of the converter, coupled with the best obtainable value of peak efficiency and it is the general object of this invention to provide a new and improved apparatus by means of which these desirable ends may be attained to a greater degree than has heretofore been the case. A further object is to attain the desired superior operating characteristics by a construction requiring the fewest possible turbine stages to meet the required conditions, in order both to simplify and to reduce the cost of the apparatus.

Other and more detailed objects will appear as this description proceeds and the manner in which the several objects are attained and the advantages to be derived from use of the invention will best be understood from the ensuing portion of this specification, taken in conjunction with the accompanying drawings, in which:

Fig. 1 is a fragmentary longitudinal half section of a converter circuit and blade system embodying the invention;

Figs. 2 to 5 inclusive are sections taken on the respectively numbered section lines of Fig. 1;

Fig. 6 is a velocity diagram illustrative of different inlet conditions with guide blades of different profile at high and low values of the speed ratio $n_2/n_1$; and Fig. 7 is another diagram illustrative of comparative losses with blades of different inlet edge radius.

Referring now to Fig. 1 and related figures, the converter illustrated is of the rotating casing 2-stage type. The rotatable casing 10 constituting the primary member, the axis of rotation of which is indicated at A, carries a ring of impeller or pump blades 12 connected by an inner core ring element 14. The rotatably mounted secondary or turbine member 16 carries the ring of second stage turbine blades 18, the inner ends of which support the core element 20, which in turn supports the ring of first stage turbine blades 22. The reaction member 24 may be fixed against rotation in either direction at all times, it may be mounted for rotation in either direction under certain conditions, and in the case of so-called double rotation converters it may be arranged to deliver power when acting as a moving reaction member rotating in a direction opposite that of the impeller. Member 24 carries the ring of reaction guide blades 26, the blades being connected at their inner ends by the ring element 28.

From the drawing, it will be seen that the core forming the inner perimeter of the cross section of the circuit or path of flow for the working fluid, is formed by elements 14, 20 and 28. The outer perimeter of the section of the circuit is formed by the casing 10, the turbine member 16, a part of the reaction member 24 and a curved deflector element 30 carried by the first stage turbine blades 22.

As will become more apparent as this description proceeds, the invention is not limited in its application to converters of the above described construction, but is equally applicable to other known forms of hydrodynamic converters having different numbers of turbine and reaction stages and in which either rotating or stationary casings may be employed.

Referring now more particularly to Figs. 2 to 5, $\alpha$ indicates the outlet or discharge angles of the several blades, and $b$ the minimum distance between adjacent blades of the same ring, or, in other words, the narrowest or throat portion of the flow channel between the blades.

In Figs. 3 to 5 the relative inlet angle of the fluid entering the guide and the turbine blade rings at stall, that is, with the impeller turning at a normal speed and the turbine stationary, is indicated by the arrows $I_{st}$, while arrows $I_{sh}$ indicate the direction of the relative inlet velocity at the shift point. The angle of divergence between these two conditions, which mark the limits of the useful range of the converter, is denoted by $\gamma$.

By comparing Figs. 3, 4 and 5 it will be observed that the angle of divergence $\gamma$ in the case of the guide blades is materially greater than in the cases of both stages of turbine blades. The greater deviation of the relative inlet angle from the optimum angle (represented by $I_o$) in the case of the guide blades, which is characteristic of converters of the kind under consideration that are properly designed to meet the several required conditions, results in increased losses on both sides of the peak efficiency point being incurred more rapidly at the guide blade ring than at the turbine rings if the converter is equipped with blades of the same general type of profile and this factor tends to lower both the value of the stall torque ratio obtainable and the value of the speed ratio $n_2/n_1$ at the shift point. It is the case for all blades in the circuit that the relative inlet angle will deviate, with changes in the speed ratio $n_2/n_1$ from the optimum direction $I_o$ productive of minimum inlet losses, and in order to reduce losses in all blade rings due to such deviation it is preferable to use blades having profiles characterized by inlet edge portions which are bluntly rounded. The profiles are further shaped with remaining portions which with the inlet edge portions provide curved flow channels which serve to laterally deflect the fluid traversing the channels and also accelerate its rate of flow, since the flow area of the channels decreases, first relatively rapidly and thereafter more gradually, from the inlets to the throats $b$ at the outlets.

The general type of blade profile and channel just described is not broadly new but in accordance with certain aspects of this invention the nature of these profiles and channels are changed as compared with prior practice in order to secure the improved results which are obtained.

In accordance with one of these aspects the inlet edge portions of the guide blade profiles are made relatively more blunt than those of the turbine blades and since the blade profiles are of gradually changing curvature it is necessary in the interest of clarity to define the inlet edge portions of the profiles and their nature in the terms hereinafter employed in this description and the appended claims. In general, the inlet edge portions are arcuate in form and may be an exact arc of given radius. On the other hand, these portions may deviate from exact circular arcs while still retaining generally or approximate circular form of radius $r$ with respect to a center $o$ as illustrated in Fig. 5. It will therefore be understood that as hereinafter employed the term radius, as applied to the inlet edge portions of the blade profiles, is to be understood as defining profiles having approximately circular inlet edge portions as well as those of exact circular form. Also, the inlet edge portions will be understood as those portions on the inlet side of a line $s$ drawn perpendicularly to the direction of optimum relative inlet flow $I_o$ at the center $o$, as is also shown in Fig. 5. Further, for purposes of explanation and definition, the width of the blades will be considered as the distance $w$ (Fig. 5) from the inlet to the outlet edges, the length $l$ of the blades being indicated on Fig. 1.

As previously noted, the inlet edge portions of the guide blades are more bluntly rounded in accordance with one feature of the invention than are the turbine blades, and it has been found that in a given circuit, other conditions being equal, even a small change in the relative bluntness of the blades has a favorable effect. However, in order to secure to the fullest extent the advantages to be derived from this change, I have found that the differences in blade profile employed should be kept within relatively well defined limits which can conveniently be expressed in terms of the values of the ratios of the radii $r$ of the blades to the width $w$ of the blades, i. e. $r/w$.

Because of the latitude possible in the design of the impeller, the value of the angle of divergence $\gamma$ at the inlet of the first stage turbine ring may in some instances be made relatively small and consequently the first stage turbine blades may in such cases be made with relatively sharp inlets. I have found however, that for any acceptable impeller design, the maximum value for the ratio $r/w$ of the first stage turbine blades is approximately 0.135, since if this value is appreciably exceeded, the peak efficiency is adversely affected. The possible variation in the value of $\gamma$ at the guide blade inlet, with variations in specific design and arrangement of the first stage turbine blades, is not so great as at the first stage turbine inlet, but the variations that may be encountered in different designs permit a certain range of values to be used for the ratio $r/w$ of the guide blades, such range, however, being limited to a minimum of approximately 0.120 and a maximum of approximately 0.160. If the maximum is exceeded appreciably the adverse effect on peak efficiency becomes too great, and if at least substantially the minimum is not used, the advantages sought by the present invention are not attainable.

The variation in the width of the second stage turbine blades as between different designs is such that the value of $r/w$ for these blades in somes instances may be quite low, as for example in a two stage turbine wherein very wide blades are used in order to obtain certain desired input torque absorbing characteristics, but as in the cases of the other blades, I have found that certain limitations apply and that in the case of second stage turbine blades the value of $r/w$ should not exceed approximately 0.125 if adverse effect on efficiency is to be avoided.

With the above limits in mind, the relation between the values of the ratios $r/w$ of the different blade rings required to achieve the results obtainable from the invention are to be considered. In general it may be said that these values vary together in the same sense as between different designs, that is, if more bluntly rounded blades are called for in one design than in another, for a given blade ring, the same is generally true for the other rings. In addition, in order to secure the desired results in accordance with the principles of this invention, the guide blade inlets must be materially more blunt than those of the turbine blade inlets and I have found that in order to fully realize the potential advantages available the profiles of the guide blades advantageously have a ratio $r/w$ the value of which is at least 20% greater than the value of the comparable ratios of the turbine blades. As has previously been noted the first stage turbine blades may have a value of as high as 0.135 for the ratio $r/w$, while the lower limit of the range of permissible values for the ratio $r/w$ for the guide blades is approximately 0.120, but it will be understood that the maximum value for the former will not be used with the minimum value for the latter and that a difference of the order of at least 20% greater value for the ratio $r/w$ for the guide blades will be adhered to. This applies also to the relation of the ratio $r/w$ for the guide blades to the comparable ratio of a succeeding or second stage ring of turbine blades.

If we now consider the effect of the relatively more blunt guide blade inlets it will be found that when the relative inlet flow is along the optimum direction $I_o$, a slightly increased loss is incurred. This loss affects only the peak efficiency value, and it is important to note that the increased loss is incurred only at the guide blade inlet, and does not affect the losses at the inlets of the turbine blades. Thus the reduction in peak efficiency is relatively minor. On the other hand, the relatively more blunt inlets for the guide blades will accommodate with less loss than would otherwise be the case, the deviations in the direction of inlet flow from the optimum direction and also will accommodate without undue increase in inlet loss a much greater deviation of the inlet flow from the optimum direction than would otherwise be the case. Thus, as to the guide blade ring, a slight loss at optimum flow conditions is compensated for by relatively improved performance over the remainder of the useful range of speed ratios. A most important factor, however, is that at other than the optimum point, decrease in the losses resulting from the more blunt guide blades is reflected in a relatively increased rate of flow (quantity per unit time), of the working fluid. This increased rate of flow is obtained not only through the guide blade ring but also through the turbine blade rings, and the effect of the increased rate of flow favorably affects the relative inlet angle of flow to the turbine blades with consequent increase in efficiency of the turbine blades. Thus, by following the principles discussed above a slightly increased loss at one blade ring in the circuit under optimum conditions is more than compensated for by decreased losses at a plurality of blade rings in the circuit under all other conditions over the entire operating range.

Referring again to Fig. 1, it will be seen that the guide blades 26 have shorter inlet edge portions than outlet edges, this being determined in the present instance by the shape of the peripheral flange portion of the reaction member 24 to which the blades are attached. This provides an additional feature cooperating with the relatively more blunt profiles to decrease losses at the guide blade inlet under other than optimum flow conditions.

The shortened inlet edges of the guide blades result in greater radial velocity of the working fluid at the blade inlets than would otherwise be the case, and since the peripheral velocity of the fluid at this place is independent of the radial velocity, the increase in the radial velocity affects the velocity triangle in such a way as to result in a decrease in the value of the angle $\gamma$ of deviation of the relative inlet angle between the extreme positions $I_{st}$ and $I_{sh}$. The nature of this action is illustrated in the diagram of Fig. 6, in which the velocity triangles for both stall and shift point conditions are shown, the former being shown by the right side of the diagram and the latter by the left side. In the diagram $C_u$ represents peripheral velocities and $C_a$ represents radial velocities in a circuit in which the blades are not shortened at their inlet edges, while $C'_a$ represents the increased radial velocities obtained by shortening the inlet edges, the peripheral velocity $C_u$ not being affected and remaining the same in both cases. The resultant relative inlet velocities in the one case are shown at $C_{st}$ and $C_{sh}$ and in the other at $C'_{st}$ and $C'_{sh}$ and from the figure it will be evident the manner in which the angle of deviation $\gamma$ is decreased from $\gamma_1$ in the first case to $\gamma'_1$ in the second case.

Fig. 7 illustrates the relation of the losses obtained with blades having the usual profile as heretofore employed, compared with the losses resulting from the use of blades having the more blunt guide blade profiles contemplated by the present invention. In the diagram of this figure, the losses in percent of the total velocity head, that is, the static plus the dynamic losses, is plotted against the relative inlet angle of flow to the blades at the entrance of the blade ring. The angle $\beta$ represents the angle between the direction $I_{st}$ of fluid flow at stall and the line tangent to the inlet edges of two adjacent blades of a guide ring. Curve $x$ represents the losses with conventional blading while curve $y$ represents the losses for blading embodying principles of this invention, these losses being shown over the operating range of the ratio $n_2/n_1$. As will be seen from the figure, curve $x$ shows very slightly lower losses at and near the point of maximum efficiency than does curve $y$, but the latter shows materially lower losses elsewhere in the range. The effect of shortening the inlet edges of the blades is also shown by the figure, since with the conventional length of inlet edge the losses between the stall and shift point extend over the range indicated by $\gamma_1$ and with the shortened edges the losses extend only over the range $\gamma'_1$. Obviously the lower average loss over the lesser range of variation of the angle represented by the portion of curve $y$ over the range $\gamma'_1$ is reflected in increased average efficiency between the stall and shift points.

As previously noted, one of the characteristics desirable to obtain is a high value of torque multiplication at stall and in order to do this a construction tending to produce an efficiency curve having a steeply rising characteristic from the zero value at stall is required.

For a given primary torque absorbing capacity, the rate of rise of the portion of the efficiency curve under consideration is largely dependent upon the rate of circulation, greater increase in the circulation rate from that obtaining at the peak efficiency point, as stall conditions are approached, resulting in steeper rise of the curve and increased stall torque ratio. I have found that the rate of increase of the circulation rate is dependent to a substantial extent on the inlet conditions of the impeller and further that these conditions may be materially improved so that the rate of circulation at and near stall is increased, by proper selection and correlation of the blade profiles to produce flow channels having certain deflection characteristics as well as contracting flow areas. Many known factors which need not be discussed herein in detail influence the exact design in different cases, but in general in accordance with the principles of the present invention I employ a turbine blade ring discharging to the impeller in which the blades are as "open" as good design permit, i. e. blades arranged with a relatively large outlet angle $a$ (for example 45°) and correlate the form and arrangement of the preceding rings of blades to produce flow channels having, in combination, novel characteristics productive of improved results when used in conjunction with such a ring of open blades.

In order best to understood the factors involved and the manner in which they are applied and correlated, reference is again had to Figs. 3 to 5, in which the angle $\phi$, being the angle between the line determinative of the outlet angle of the blade and the line Io representing the direction of optimum inlet flow to the blade, is used to designate the angle of deflection of flow channels formed between adjacent blades. The angles $\phi$ for the channels of the different rings and the relation between the angles $\phi$ for the different rings are, I have found, of major importance and in order to secure the desired improved results these angles advantageously lie within certain ranges and with certain relationships which are indicated by the following tabulation.

| Blade Ring | Min., degrees | Max., degrees |
|---|---|---|
| 1st Turbine Stage | 50 | 90 |
| Guide | 25 | 50 |
| 2nd Turbine Stage | 40 | 65 |

From the foregoing tabulation it will be observed that the angle of deflection for the guide blades is within a range of values lower than the ranges for both stages of turbine blades; and that the angle $\phi$ for the second stage turbine is within a range lower than that for the first stage turbine. It will further be noted that with the ranges given above, the maximum value of the guide blade angle is slightly greater than the minimum value of the second stage turbine blade angle, so that the ranges slightly overlap. However, with variations in design the angles $\phi$ for the several blade rings vary in like manner, so that the minimum value of $\phi$ for one ring will not be used with the maximum value of $\phi$ for another. Consequently, the deflection angle for the guide blade ring will be less than the values for the turbine blade rings and the angle for the second stage turbine blade ring will be less than that for the first stage turbine blade ring, in each individual case.

These relationships are at variance with usual prior practice and result in several advantages favorably affecting the performance of the converter both as to efficiency and as to the location of the shift point with reference to the speed ratio $n_2/n_1$.

In the case both of the first stage turbine blades and the guide blades the outlet angles $a$ are considerably smaller than for the relatively open second stage turbine blades, a suitable outlet angle for these blades being 25°, while for the guide blades a suitable outlet angle is 35°.

With outlet angles and deflection angles of the nature described, substantially more energy is absorbed from the fluid by the first stage turbine than by the second stage turbine and this contributes to increased efficiency due to the fact that the larger portion of the energy is absorbed directly from the discharge of the impeller where flow conditions are best because of lack of disturbance from a preceding blade ring.

Also, as will be seen from Fig. 5, as the ratio $n_2/n_1$ approaches the shift point the direction of relative inlet flow to the second stage turbine channels approaches the direction of outlet flow from these channels. This is much more the case with the second stage turbine blades than with the first stage blades, so that as the shift point is approached the first stage turbine blades absorb an increasingly greater percentage of the available energy, the second stage blades becoming progressively more in the nature of guide blades for properly directing flow to the pump inlet. These factors contribute to the maintenance of high efficiency in the portion of the speed range of $n_2/n_1$ above the peak efficiency point and consequently tend to raise the value of $n_2/n_1$ where the shift point occurs.

As will be appreciated by those skilled in the art, the various factors of blade profile, outlet angles, flow deflection etc., all influence each other and it will therefore be understood that only general rules of guidance for laying out a blade system to meet a specific performance requirement can be made. However, from actual test experience I have found that by following the principles above discussed and maintaining the several design factors within the limits stated, the desired improved results are obtainable. Obviously variations in other factors not discussed herein in detail, such for example as specific outlet angles, may be made, but the nature and extent to which such variations may be made to provide a suitable system embodying the principles of this invention are known and well within the capabilities of the skilled designer.

Referring again to Fig. 1, it will be noted that in both of the free flow sections 32 and 38 of the circuit the direction of fluid flow is altered to the extent of being substantially reversed in direction, this being true even in case a wider blade 18 than shown is used, as is sometimes the case in order to obtain certain specific primary torque absorbing characteristics. Therefore, for purposes of description these portions of the circuit may be conveniently termed reverse bend portions and in these portions there occurs what may be termed alteration losses produced by the change in direction of flow. These losses I have found can be appreciably reduced by accelerating the velocity of flow into the blade ring to which the reverse bend portions deliver fluid and this is conveniently accomplished by forming these portions as heretofore described. In most instances, the important factor of accelerated flow in the discharge part of the return bend portions is practically obtainable, because of other factors, by making the entrance parts of these portions of increasing flow area, as in the example illustrated. However, in some cases it may be possible to make the length of the blades discharging to the return bend portions of sufficient length so that the entrance parts of the return bend portions can be of substantially constant flow area. The important factor in decreasing alteration losses is, however, the acceleration of flow in the discharge part of the return bend portions.

The effect of decreasing the alteration losses is also to tend to increase the rate of circulation of the fluid, which as previously explained, is a major factor in the production of improved performance in the ranges of the speed ratio $n_2/n_1$ below and above the peak efficiency point, resulting in better torque multiplication at stall, a higher value of $n_2/n_1$ at the shift point, and better average efficiency over the operating range.

From the foregoing it will be evident that many specific variations in design may be made without departing from the principles of the invention, that such principles may be applied to converters of different types and numbers of stages and that certain features of the invention may be used to the exclusion of others. The invention is therefore to be considered as including all structures embraced by the terms of the appended claims.

What is claimed:

1. A hydrodynamic torque converter having a closed circuit in which are located a ring of pump blades, at least two rings of turbine blades and a ring of guide blades disposed between the rings of turbine blades, one of said rings of turbine blades being located to discharge in generally radially outward direction and said ring of guide blades being located to receive the discharge from said one of said rings of turbine blades in generally radially inward direction, there being a free flow area portion of the circuit shaped to substantially reverse the radial direction of flow of the working fluid between said one of said rings of turbine blades and said ring of guide blades, said ring of guide blades having bluntly rounded inlet edge portions shorter than the discharge edges thereof and the value of the ratio of the radius of curvature of the bluntly rounded inlet edge portions of the blades in profile to the width of the blades from the inlet edges to the outlet edges thereof being greater than the value of the comparable ratio in the case of at least the first ring of turbine blades traversed by the working fluid, and said portion of the circuit further being shaped to provide, in the direction of flow of the working fluid, a path of flow of decreasing cross sectional area to said shorter inlet edge portions of said guide blades.

2. A hydrodynamic torque converter having a closed circuit in which are located a ring of pump blades, at least two rings of turbine blades and a ring of guide blades disposed between the rings of turbine blades, one of said rings of turbine blades being located to discharge in generally radially outward direction and said ring of guide blades being located to receive the discharge from said one of such rings of turbine blades in generally radially inward direction, there being a free flow area portion of the circuit shaped to substantially reverse the radial direction of flow of the working fluid between said one of said rings of turbine blades and said ring of guide blades, said ring of guide blades having shorter inlet edge portions than discharge edges, said shorter inlet edge portions being bluntly rounded and of greater radius of edge curvature in profile in proportion to the width of the blades from the inlet edges to the outlet edges thereof, than at least the first of said rings of turbine blades.

3. In a hydrodynamic torque converter providing a closed circuit, an impeller for circulating working fluid in said circuit, a ring of turbine blades in said circuit and a ring of guide blades in said circuit located to receive the fluid discharged from said turbine blades, said blades being shaped with profiles including bluntly rounded inlet edge portions and remaining portions providing flow channels between adjacent blades in the same row of contracting flow area in the direction of fluid flow through the channels and the value of the ratio of the radius of curvature of the bluntly rounded inlet edge portions of the blades in profile to the width of the blades from the inlet edges to the outlet edges thereof in the case of the guide blades being greater than the value of the comparable ratio in the case of the turbine blades.

4. In a hydroynamic torque converter providing a closed circuit, an impeller for circulating working fluid in said circuit, a ring of turbine blades in said circuit and a ring of guide blades in said circuit located to receive the fluid discharged from said turbine blades, said blades being shaped with profiles including bluntly rounded inlet edge portions and remaining portions providing flow channels between adjacent blades in the same row of contracting flow area in the direction of fluid flow through the channels, the value of the ratio of the radius of curvature of the bluntly rounded inlet edge portions of the blades in profile to the width of the blades from the inlet edges to the outlet edges thereof in the case of the guide blades being greater than the value of the comparable ratio in the case of the turbine blades, the value of said ratio in the case of the guide blades lying within a range of which the upper limit is approximately 0.160 and the lower limit is approximately 0.120, and the maximum value of said comparable ratio in the case of the turbine blades not exceeding approximately 0.135.

5. In a hydrodynamic torque converter providing a closed circuit, an impeller for circulating working fluid in said circuit, a ring of turbine blades in said circuit and a ring of guide blades in said circuit located to receive the fluid discharged from said turbine blades, said blades being shaped with profiles including bluntly rounded inlet edge portions and remaining portions providing flow channels between adjacent blades in the same row of contracting flow area in the direction of fluid flow through the channels, the value of the ratio of the radius of curvature of the bluntly rounded inlet edge portions of the blades in profile to the width of the blades from the inlet edges to the outlet edges thereof in the case of the guide blades being greater than the value of the comparable ratio in the case of the turbine blades, the value of said ratio in the case of the guide blades lying within a range of which the upper limit is aproximately 0.160 and the lower limit is approximately 0.120 and the value of said ratio in the case of the guide blades further being at least approximately 20% greater than the value of the comparable ratio in the case of the turbine blades.

6. In a hydrodynamic torque converter providing a closed circuit, an impeller for circulating working fluid in said circuit, a first stage ring of turbine blades, a ring of guide blades and a ring of second stage turbine blades, said rings of blades being located in said circuit to be traversed by the working fluid in the order named and said blades being shaped with profiles including bluntly rounded inlet edge portions and remaining portions providing flow channels between adjacent blades in the same row of contracting flow area in the direction of fluid flow through the channels and the ratio of the radius of curvature of the bluntly rounded inlet edge portions of the blades in profile to the width of the blades from the inlet edges to the outlet edges thereof in the case of the guide blades being greater than the comparable ratio in the cases of both said first stage turbine blades and said second stage turbine blades.

7. In a hydrodynamic torque converter providing a closed circuit, an impeller for circulating working fluid in said circuit, a first stage ring of turbine blades, a ring of guide blades and a ring of second stage turbine blades, said rings of blades being located in said circuit to be traversed by the working fluid in the order named and said blades being shaped with profiles including bluntly rounded inlet edge portions and remaining portions providing flow channels between adjacent blades in the same row of contracting flow area in the direction of fluid flow through the channels, the ratio of the radius of curvature of the bluntly rounded inlet edge portions of the blades in profile to the width of the blades from the inlet edges to the outlet edges thereof in the case of the guide blades being greater than the comparable ratio in the cases of both said first stage turbine blades and said second stage turbine blades, and the difference between the value of said ratio in the case of the guide blades and said comparable ratio in the case of the second stage turbine blades being greater than the difference between the value of said ratio in the case of the guide blades and said comparable ratio in the case of the first stage turbine blades.

8. In a hydrodynamic torque converter providing a closed circuit, an impeller for circulating working fluid in said circuit, a first stage ring of turbine blades, a ring of guide blades and a ring of second stage turbine blades, said rings of blades being located in said circuit to be traversed by the working fluid in the order named and said blades being shaped with profiles including bluntly rounded inlet edge portions and remaining portions providing flow channels between adjacent blades in the same row of contracting flow area in the direction of fluid flow through the channels, the ratio of the radius of curvature of the bluntly rounded inlet edge portions of the blades in profile to the width of the blades from the inlet edges to the outlet edges thereof in the case of the guide blades being greater than the comparable ratio in the cases of both said first stage turbine blades and said second stage turbine blades, the value of said ratio in the case of the guide blades lying within a range of which the upper limit is approximately 0.160 and the lower limit is approximately 0.120, the maximum value of said comparable ratio in the case of the first stage turbine blades being approximately 0.135 and the maximum value of said comparable ratio in the case of the second stage turbine blades being approximately 0.125.

9. In a hydrodynamic torque converter providing a closed circuit, an impeller for circulating working fluid in said circuit, a ring of turbine blades in said circuit and a ring of guide blades in said circuit located to receive the fluid discharged from said turbine blades, said blades being shaped with profiles including bluntly rounded inlet edge portions and remaining portions providing curved flow channels between adjacent blades in the same row for deflecting the fluid flowing therethrough, said channels being of contracting flow area in the direction of fluid flow therethrough, the angle of deflection of the channels in said guide blade ring being less than the comparable angle in said turbine blade ring and the value of the ratio of the radius of the curvature of the inlet edge portions of the blades in profile to the width of the blades from the inlet edges to the outlet edges thereof in the case of the guide blades being greater than the value of the comparable ratio in the case of the turbine blades.

10. In a hydrodynamic torque converter providing a closed circuit, an impeller for circulating working fluid in said circuit, a ring of turbine blades in said circuit and a ring of guide blades in said circuit located to receive the fluid discharged from said turbine blades, said blades being shaped with profiles including bluntly rounded inlet edge portions and remaining portions providing curved flow channels between adjacent blades in the same row for deflecting the fluid flowing therethrough, said channels being of contracting flow area in the direction of fluid flow therethrough, the angle of deflection of the channels in said guide blade ring lying within a range of which the upper limit is approximately 50° and the lower limit of which is approximately 25°, the comparable angle of the channels in said turbine blade ring lying within a range of which the upper limit is approximately 90° and the lower limit is approximately 50°, said angle of deflection being less than said comparable angle and the value of the ratio of the radius of curvature of the inlet edge portions of the blades in profile to the width of the blades from the inlet edges to the outlet edges thereof in the case of the guide blades being greater than the value of the comparable ratio in the case of the turbine blades.

11. In a hydrodynamic torque converter providing a closed circuit, an impeller for circulating working fluid in said circuit, a ring of turbine blades in said circuit and a ring of guide blades in said circuit located to receive the fluid discharged from said turbine blades, said blades being shaped with profiles including bluntly rounded inlet edge portions and remaining portions providing curved flow channels between adjacent blades in the same row for deflecting the fluid flowing therethrough, said channels being of contracting flow area in the direction of fluid flow therethrough, the angle of deflection of the channels in said guide blade ring lying within a range of which the upper limit is approximately 50° and the lower limit of which is approximately 25°, the comparable angle of the channels in said turbine blade ring lying within a range of which the upper limit is approximately 90°, and the lower limit is approximately 50°, said angle of deflection being less than said comparable angle, the value of the ratio of the radius of curvature of the inlet edge portions of the blades in profile to the width of the blades from the inlet edges to the outlet edges thereof in the case of the guide blade ring lying within a range of which the upper limit is approximately 0.160 and the lower limit is approximately 0.120, the maximum value of the comparable ratio in the case of the turbine blade ring not exceeding approximately 0.135, and the value of said ratio in the case of the guide blade ring being greater than said maximum value of said comparable ratio.

12. In a hydrodynamic torque converter providing a closed circuit, an impeller for circulating working fluid in said circuit, a first stage ring of turbine blades, a ring of guide blades and a ring of second stage turbine blades, said rings of blades being located in said circuit to be traversed by the working fluid in the order named and said blades being shaped with profiles including bluntly rounded inlet edge portions and remaining portions providing curved flow channels between adjacent blades in the same row for laterally deflecting the fluid flowing therethrough, the angle of deflection of the channels in said guide blade ring being less than the comparable angles in both of said turbine blade rings and the value of the ratio of the radius of curvature of the inlet edge portions of the blades in profile to the width of the blades from the inlet edges to the outlet edges thereof in the case of the guide blades being greater than the value of the comparable ratio in the cases of both of the turbine blade rings.

13. In a hydrodynamic torque converter providing a closed circuit, an impeller for circulating working fluid in said circuit, a first stage ring of turbine blades, a ring of guide blades and a ring of second stage turbine blades, said rings of blades being located in said circuit to be traversed by the working fluid in the order named and said blades being shaped with profiles including bluntly rounded inlet edge portions and remaining portions providing curved flow channels between adjacent blades in the same row for laterally deflecting the fluid flowing therethrough, the angle of deflection of the channels in said guide blade ring lying within a range of which the upper limit is approximately 50° and the lower limit is approximately 25°, the comparable angle in the case of the second stage turbine blade ring lying within a range of which the upper limit is approximately 65° and the lower limit is approximately 40°, the comparable angle in the case of the first stage turbine ring lying within a range of which the upper limit is approximately 90° and the lower limit is approximately 50°, and said angle of deflection in the case of the guide blade ring being less than said comparable angles for the cases of both the first stage and the second stage turbine rings.

14. In a hydrodynamic torque converter providing a closed circuit, an impeller for circulating working fluid in said circuit, a ring of turbine blades in said circuit and a ring of guide blades in said circuit located to receive the fluid discharged from said turbine blades, said blades being shaped with profiles including bluntly rounded inlet edge portions and remaining portions providing curved flow channels between adjacent blades in the same row for deflecting the fluid flowing therethrough, said channels being of contracting flow area in the direction of fluid flow therethrough, the angle of deflection of the channels in said guide blade ring lying within a range of which the upper limit is approximately 50° and the lower limit of which is approximately 25°, the comparable angle of the channels in said turbine blade ring lying within a range of which the upper limit is approximately 90° and the lower limit is approximately 50°, and said angle of deflection being less than said comparable angle.

15. In a hydrodynamic torque converter providing a closed circuit, an impeller for circulating working fluid in said circuit, a first stage ring of turbine blades, a ring of guide blades and a second stage ring of turbine blades, said rings of blades being located in said circuit to be traversed by the working fluid in the order named and said blades being shaped with profiles including bluntly rounded inlet edge portions and remaining portions providing curved flow channels between adjacent blades in the same row for laterally deflecting the fluid flowing therethrough, the angle of deflection of the channels in said guide blade ring being less than the comparable angles in both of said turbine blade rings and the angle of deflection of the channels in the second stage turbine ring being less than the comparable angle in the first stage turbine ring.

16. A hydrodynamic torque converter having a closed circuit including a radial outflow portion and a radial inflow portion, a ring of pump blades, at least two rings of turbine blades and a ring of guide blades located in said circuit, the ring of pump blades and one of the rings of turbine blades being disposed in the outflow portion of the circuit, the ring of guide blades and the second ring of turbine blades being disposed in the inflow portion of the circuit with the ring of guide blades arranged between the rings of turbine blades, the blades of said ring of guide blades and of at least the first stage ring of said turbine blades having constant profiles along their respective lengths, said guide blades having inlet edge portions of greater radius of edge curvature in profile in proportion to the width of the blades from the inlet edges to the outlet edges thereof than at least said first stage of turbine blades, said circuit further having a portion of free flow area at the radial inner part of the circuit, and shaped to reverse the radial direction of flow of the working fluid between said radially directed flow portions, said portion of free flow area being between the inlet side of the pump blade ring and the outlet side of the blade ring discharging to the pump and the last mentioned portion providing, in the direction of flow of the working fluid, a path of flow first of increasing cross-sectional area and then of decreasing cross-sectional area.

References Cited in the file of this patent

UNITED STATES PATENTS

| Number | Name | Date |
|---|---|---|
| 2,102,635 | Lysholm et al. | Dec. 21, 1937 |
| 2,255,430 | Lysholm et al. | Sept. 9, 1941 |
| 2,292,384 | Lysholm | Aug. 11, 1942 |
| 2,418,362 | Miller | Apr. 1, 1947 |
| 2,441,818 | Jandasek | May 18, 1948 |
| 2,558,976 | O'Leary | July 3, 1951 |
| 2,607,456 | Jandasek | Aug. 19, 1952 |

FOREIGN PATENTS

| Number | Country | Date |
|---|---|---|
| 504,914 | Great Britain | May 1, 1939 |